W. V. TURNER.
ELECTROPNEUMATIC BRAKE.
APPLICATION FILED MAY 4, 1918.
1,299,269.
Patented Apr. 1, 1919.
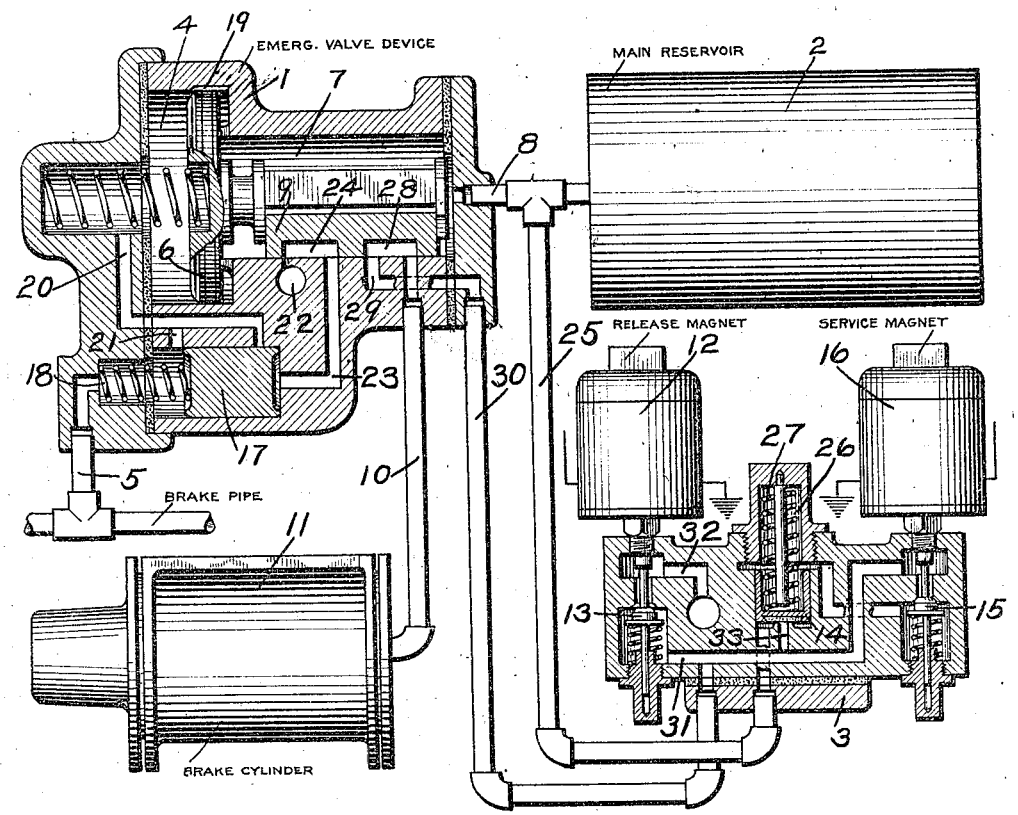
INVENTOR.
Walter V. Turner
by Wm M Cady
Att'y.

UNITED STATES PATENT OFFICE.

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

ELECTROPNEUMATIC BRAKE.

1,299,269.  Specification of Letters Patent.  Patented Apr. 1, 1919.

Application filed May 4, 1918. Serial No. 232,439.

*To all whom it may concern:*

Be it known that I, WALTER V. TURNER, a citizen of the United States, residing at Wilkinsburg, in the county of Allegheny and State of Pennsylvania, have invented new and useful Improvements in Electropneumatic Brakes, of which the following is a specification.

This invention relates to fluid pressure brakes and the principal object of the invention is to provide means for effecting the quick release of the brakes after an emergency application.

In the accompanying drawing, the single figure is a diagrammatic view, partly in section, of a car brake equipment embodying my invention.

According to the construction shown in the drawing, the equipment may comprise an emergency valve device 1, a main reservoir 2, adapted to be charged with fluid under pressure, and an electro-pneumatic brake controlling valve device 3.

The emergency valve device 1 may comprise a casing having a piston chamber 4, connected to emergency brake pipe 5, and containing a piston 6, and a valve chamber 7, connected by pipe 8 to main reservoir 2, and containing a slide valve 9 for controlling the admission and release of fluid under pressure, through pipe 10, to and from a brake cylinder 11.

The electro-pneumatic brake controlling valve device 3 may comprise a release magnet 12 for operating a release valve 13, a relay valve 14, a pilot valve 15, for varying the fluid pressure on relay valve 14, and an application magnet 16 for operating the pilot valve 15.

According to my invention, a double check valve 17, subject on one side to the pressure of a spring 18, controls communication from the brake pipe 5 to the piston chamber 4.

In operation, fluid is supplied from the main reservoir 2 to the valve chamber 7 and flows through feed groove 19 to piston chamber 4, and thence flows through passage 20 and port 21 to the brake pipe 5, charging said brake pipe to the pressure carried in the main reservoir, and one side of the double check valve 17 being connected to exhaust port 22 in the release position of slide valve 9, through passage 23 and cavity 24, the spring 18 normally maintains the double check valve 17 in the position shown in the drawing, with the port 21 open to the brake pipe 5.

Fluid is also supplied from the main reservoir 2 through pipe 25 to the outer seated area of relay valve 14, and thence leaks around said valve to the spring chamber 26, containing spring 27 which acts on the relay valve.

If the release magnet 12 is energized, the brake cylinder 11 is connected to the exhaust through cavity 28 in slide valve 9, passage 29, pipe 30, passage 31, and past the open release valve 13 to exhaust port 32.

An electro-pneumatic service application of the brakes may be effected by energizing the magnet 16, so that the valve 15 is opened to vent fluid from spring chamber 26. The relay valve 14 is then operated by the fluid pressure acting on the outer seated area of same, so as to open communication from pipe 25 to port 33 and passage 31, thus allowing fluid to flow from the main reservoir 2, to the brake cylinder 11, through pipe 30, passage 29, cavity 28, and pipe 10.

An emergency application of the brakes may be effected by suddenly reducing the pressure in emergency brake pipe 5, whereupon the piston 6 operates the slide valve 9, so as to connect the brake cylinder pipe 10 directly to the valve chamber 7.

In order to obtain a quick release of the brakes after an emergency application, the magnet 16 is energized so as to open the pilot valve 15 and thereby the relay valve 14 is opened, as in an electric service application, to admit fluid from the main reservoir to pipe 30.

In the emergency application position of slide valve 9, the pipe 30 is connected through passage 29 and cavity 28 with passage 23, so that fluid from the main reservoir is supplied to the double check valve 17, and since the opposite side of said check valve is now subject to the reduced brake pipe pressure, the check valve will be shifted, so as to cut off communication from the piston chamber 4 to the brake pipe 5 and open communication from passage 23 to passage 20.

The piston 6 is then quickly shifted to release position and the inner face of the double check valve 17 being now connected to exhaust port 22 through passage 23 and cavity 24, the spring 18 operates the double check valve 17 so as to cut off communication between passages 20 and 23 and open communication from the piston chamber 4 to the brake pipe 5.

The brake pipe is then recharged with fluid under pressure, in the usual manner, by flow from the main reservoir through the feed groove 19.

In the release position of the slide valve 9, the outer face of the double check valve 17 is connected to a restricted exhaust port 22, so as to prevent the possible building up of fluid pressure by leakage on the double check valve, since this might cause the premature movement of the double check valve to cut off the passage 21 upon an emergency reduction in brake pipe pressure, before the pressure in piston chamber 4 has been sufficiently reduced to effect the movement of the emergency piston 6 to emergency position.

Since the double check valve 17 cuts off communication from the piston chamber 4 to the brake pipe 5 in an emergency application of the brakes, loss of fluid from the main reservoir is prevented, in case the service magnet 16 should happen to be energized when an emergency application of the brakes is made.

Having now described my invention, what I claim as new, and desire to secure by Letters Patent, is:

1. In a fluid pressure brake, the combination with a brake pipe and a valve device operated upon a reduction in brake pipe pressure for effecting an application of the brakes, of means for supplying fluid to said valve device to effect the release movement thereof and a double check valve operated by the flow of fluid from said means for cutting off communication from the brake pipe to said valve device.

2. In a fluid pressure brake, the combination with a brake pipe and a valve device operated upon a reduction in brake pipe pressure for effecting an application of the brakes, of a magnet controlled valve for supplying fluid to said valve device for effecting the release movement thereof and a double check valve operated by flow of fluid from said valve to said valve device for cutting off communication from the brake pipe to said valve device.

3. In a fluid pressure brake, the combination with a brake pipe, and an emergency valve device comprising a valve and a piston operated upon a reduction in brake pipe pressure for actuating said valve to effect an application of the brakes, of means for supplying fluid to said piston for effecting the release movement thereof and a double check valve normally providing communication from the brake pipe to said piston and operated by the flow of fluid from said means for cutting off communication from the brake pipe to said piston.

In testimony whereof I have hereunto set my hand.

WALTER V. TURNER.